H. L. PATZOLD.
TIRE.
APPLICATION FILED JAN. 22, 1912. RENEWED MAY 15, 1914.
1,197,392.
Patented Sept. 5, 1916.
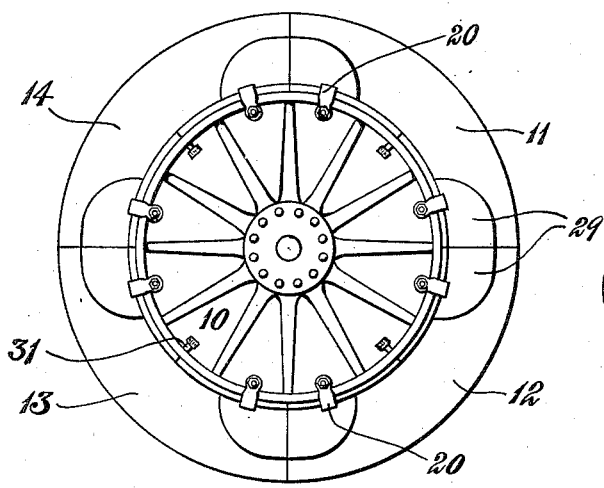
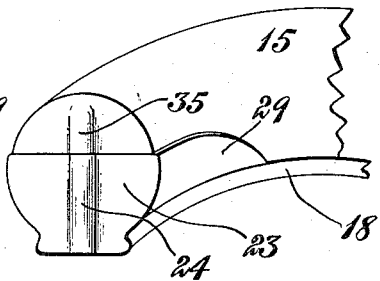
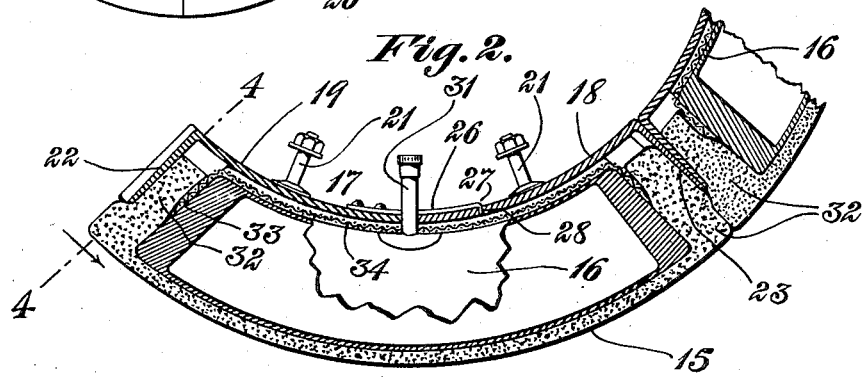
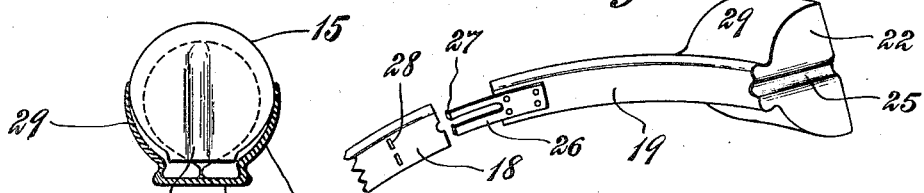
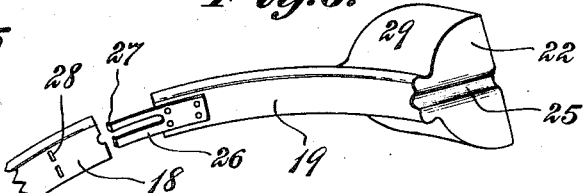
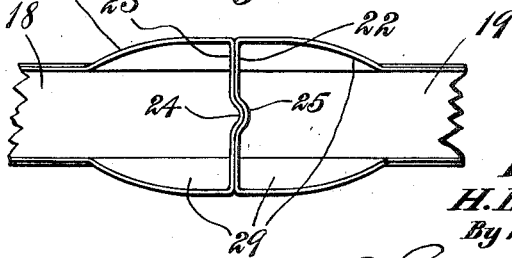
Witnesses:
Inventor:
H. L. Patzold
By his Attorneys,

UNITED STATES PATENT OFFICE.

HUGO L. PATZOLD, OF MERIDEN, CONNECTICUT.

TIRE.

1,197,392. Specification of Letters Patent. Patented Sept. 5, 1916.

Application filed January 22, 1912, Serial No. 672,595. Renewed May 15, 1914. Serial No. 838,892.

*To all whom it may concern:*

Be it known that I, HUGO L. PATZOLD, a citizen of the United States, residing at Meriden, in the county of New Haven and State of Connecticut, have invented certain new and useful Improvements in Tires, of which the following is a specification.

This invention relates to tires and a tire involving my invention can be employed with advantage in connection with wheels of various kinds, but it is of especial utility when applied to an automobile wheel.

One of the objects of the invention is to provide a tire in sections which can be readily and easily applied to and removed from a wheel, and although these sections may be of any suitable nature, each preferably includes in its make-up an inflatable member so that I can thereby obtain all the effects of the ordinary pneumatic tire. An inflatable tire is a desirable thing, but it is susceptible to puncture and when this occurs it is necessary before the tire can be removed to jack up the car. When an inflatable member is punctured and thereby deflated, this particular section can be removed without the necessity of jacking up the car and in a very simple quick manner. A tire embodying my invention possesses many other features of novelty and advantage which with the foregoing will be set forth at length in the following description wherein I will outline in detail one of the several forms of embodiment of the invention, which I have selected for illustration in the drawings accompanying and forming part of the present specification, this showing being provided to enable those skilled in the art to practice the invention. It will, therefore, be apparent that I do not restrict myself to such disclosure; I may depart therefrom in several respects within the scope of the invention incorporated in the claims following said description.

Referring to said drawings: Figure 1 is a side elevation of a wheel equipped with a tire involving my invention. Fig. 2 is a sectional elevation of one complete segment and part of an adjacent segment. Fig. 3 is a perspective view of the end portion of one of the segments. Fig. 4 is a cross section on the line 4—4 of Fig. 2 looking in the direction of the arrow. Fig. 5 is a plan view of two adjacent segments, and, Fig. 6 is a perspective view of a segment-carrier.

Like characters refer to like parts throughout the several views which it will be observed are on different scales.

In Fig. 1 of the drawings I have shown a wheel 10, and this wheel may be of any suitable nature, for instance such a one as is used upon an automobile. My tire is preferably made in sections usually and as shown of segmental form, and there may be any desirable number of such sections, for instance, and as illustrated, four, denoted respectively by 11, 12, 13 and 14. As already indicated the tire sections or segments may be of any suitable kind, although those represented are of pneumatic type and each comprises an outer casing or shoe 15, and an inner envelop or tube 16, the part 15 being usually made of canvas or other material such as is usually employed in making shoes of the ordinary kind, while the inner inflatable member 16 is of rubber or some equivalent substance.

Each segment or tire section is supported by a segmental carrier denoted in a general way by 17, and although the said carrier may be of any desirable nature, it is represented as being of sectional form being composed in the present case, of substantially similar or duplicate sections 18 and 19 usually of metal and channeled or grooved as shown to receive the beaded portions at the inner sides of the respective shoes 15. Owing to the fact that each segment-carrier is made in sections, it is an easy matter to connect or disconnect the respective parts as will hereinafter more particularly appear. The segment-carriers 17 may be connected with the wheel 10 in any desirable manner. Referring to Fig. 1 it will be seen that each carrier 17 is provided at longitudinally separated points with clamping-members 20, the members of which are adapted to clamp the carriers to the rim of the wheel, it being evident that the radius of the inner surface of the carriers is the same as that of the rim of the wheel. In Fig. 2 the carriers 17 are shown provided with bolts 21 by which said carriers can be connected to the rim of the wheel.

The carriers 17 abut at their ends and while it is possible that this abutting relation might in connection with the holding means already described properly secure the carriers to the wheel, I prefer as a matter of additional security to interlock said carriers. Each carrier is shown provided at its ends with flanges 22 and 23, and that flanges of the respective carriers are adapted preferably to fit flatwise against each other and to be also coupled together for instance by a tongue and groove joint, each flange or coupling head 22 being shown provided with a tongue or rib 24 to enter a complemental groove or channel 25 in the adjacent coupling head or flange 23 which thus provides a simple and effective means for locking the carriers together. The plates or flanges 22 are relatively thin so as to secure a certain amount of resiliency or springiness therein, by reason of which said plates or flanges will be forced solidly against each other by the compressed air in the inflatable members 16 to thus aid in holding the tire in place. While the sections of each carrier 17 might be related in any suitable way, I prefer to positively connect said sections, so that each tire-segment with its supporting carrier presents an article of manufacture and by positively connecting the sections of said carrier to each other, said carrier and its segment can be handled as a unit and applied to and removed from the wheel as such. In the construction shown the section 19 of each carrier 17 is provided with a spring latch 26, the shank of which may be riveted or otherwise suitably fastened thereto, and the active end or hooks 27 of which are adapted to enter seats or perforations 28 in the companion section 18 so as to thus securely connect the two sections of the respective carriers. By manipulating the latch it is a simple matter to separate the sections of a carrier, and when they are freed by the operation of the latch, they are slid longitudinally apart and it will be clear that when a segment is thus detached from its carrier, it becomes a simple matter to substitute a new one therefor.

It it a well-known fact that when an inner tube of an ordinary tire becomes deflated the outer tube or shoe will flatten down, and in such an event "rim-cutting," as it is known, is the consequence. I provide means for positively preventing such result and various means may be provided therefor. As represented I provide the carriers with flanges which embrace or hug each shoe and hold it to such an extent when the inner tube is deflated that said shoe cannot be flattened sufficiently to permit the disadvantage in question, and while these flanges may be located at any suitable place upon the respective carriers 17 they are shown connected with the plates or heads 22 and 23 being denoted by 29. It will be understood that in the construction shown there are two side flanges at each end of each segment, although in all cases, as will be inferred from the observations already made, this is not essential. The coupling heads or plates 22 and 23 and the flanges 29 are not as deep as the tire-segments so as not to effect the resiliency thereof.

Each inner member 16 is provided with a nipple 31 which extends through the shoe 15, carrier 17 and rim of the wheel 10, and by which said member 16 can be inflated when desired. The end walls of the inflatable members 16 are materially thickened so as to effectually resist the longitudinal pressure of the air.

The shoes 15 at their ends are shown provided with blocks 32 which are comparatively thick and which extend short of the inner portion of the said shoes. The inner tube unit 16 is incased is a canvas insert or jacket 34 between the two ends and side flanges or bodies of the casing unit 15 in order to prevent the inner tube 16 being thrust through the gap or opening between the same, the terminal portions of said insert being denoted by 33. I desire to call attention to the fact that said blocks are free, by which I mean that they are not confined by any clamping or equivalent means, so that when the inner tube becomes deflated, these blocks are at once ready to exercise their functions of cushioning the segment or equivalent. Therefore, in case a section as 16 should become deflated on the road, and the automobilist or other person should not have a new section he can safely get to a garage or other place, in that the ribs or blocks 32 act as cushions; this effect, however, can be otherwise obtained within the spirit of my invention.

One of the blocks or ribs 32 of each shoe 15 is shown provided with a projection or bead 35 to enter an inner groove (formed by the tongue 24) of the adjacent coupling head 23, while the block at the other end of said shoe has a channel to receive an internal projection (formed by the groove 25) of the companion coupling head 22, by reason of which said ribs or blocks are interlocked with the respective coupling heads to thus limit lateral motion of the shoes. It is necessary to also mention the fact that the strips 34 at the ends of which the flaps or tabs 33 are situated, extend under the respective shoes 15.

From the foregoing description taken in connection with the annexed drawing, it will be clear that I provide a unitary device which can be applied to and removed from a wheel as such. Said device comprises a tire segment preferably inflatable and a carrier therefor, the carrier being provided with means independent of the wheel to which the unit is to be attached, for maintaining the unitary relation. In the present case this carrier is in sections, the sections being adapted to clamp the segment, and the carrier being provided with means supported solely thereby for maintaining the clamping relation.

What I claim is:

1. A tire segment and a segmental carrier therefor, in sections slidably engaged with said segment from opposite ends thereof, said carrier having stop means against which the ends of the tire segment abut.

2. A tire segment and a segmental carrier therefor, in sections slidably engaged with said segment from opposite ends thereof, said carrier having stop means against which the ends of the tire segment abut, said carrier having a tongue at one end and a groove at the other end, both extending radially or depthwise of said carrier, said tongue being adapted to enter the groove in an adjacent segment, and said groove being adapted to receive a tongue on another adjacent segment.

3. A tire segment and a segmental carrier therefor, in sections longitudinally slidably engaged with said segment from opposite ends thereof, said carrier having end flanges against which the ends of the tire segment abut and also having side flanges to engage opposite sides of said tire segment.

4. A tire segment and a segmental carrier therefor, in sections longitudinally slidably engaged with said tire segment from opposite ends thereof, said carrier having means to prevent relative endwise movement of the carrier and segment and one section of the carrier having a latch and the other section thereof having a catch to be engaged by said latch to thereby removably hold the sections of the carrier together.

In testimony whereof I affix my signature in presence of two witnesses.

HUGO L. PATZOLD.

Witnesses:
WM. H. SEIFERT,
HEATH SUTHERLAND.